US005855825A

United States Patent [19]

Ito

[11] Patent Number: 5,855,825

[45] Date of Patent: Jan. 5, 1999

[54] PROCESS FOR PRODUCING OCULAR LENS AND OCULAR LENS PRODUCED BY THE PROCESS

[75] Inventor: Eri Ito, Kasugai, Japan

[73] Assignee: Menicon Co., Ltd., Nagoya, Japan

[21] Appl. No.: 836,017

[22] PCT Filed: Sep. 4, 1996

[86] PCT No.: PCT/JP96/02520

§ 371 Date: Apr. 29, 1997

§ 102(e) Date: Apr. 29, 1997

[87] PCT Pub. No.: WO97/09169

PCT Pub. Date: Mar. 13, 1997

[30] Foreign Application Priority Data

Sep. 6, 1995 [JP] Japan .................................... 7-229386

[51] Int. Cl.[6] ...................................................... B29D 11/00

[52] U.S. Cl. ....................... 264/2.6; 351/159; 351/160 R; 523/107

[58] Field of Search ............................ 264/1.1, 2.6, 343; 523/106, 107; 351/159, 160 R

[56] References Cited

U.S. PATENT DOCUMENTS

| | | |
|---|---|---|
| 4,141,941 | 2/1979 | Travnicek . |
| 5,260,000 | 11/1993 | Nandu et al. . |
| 5,457,140 | 10/1995 | Nunez et al. . |

FOREIGN PATENT DOCUMENTS

| | | |
|---|---|---|
| 1-225913 A | 9/1989 | Japan . |

*Primary Examiner*—Mathieu D. Vargot
*Attorney, Agent, or Firm*—Kubovcik & Kubovcik

[57] ABSTRACT

A process for producing an ocular lens characterized by mixing a polymerizable component for an ocular lens with an organic solvent (I) capable of dissolving the polymerizable component, injecting the obtained mixture into a mold having the desired shape for an ocular lens and then, preparing a polymer by the polymerization reaction, immersing the polymer taken off from the mold in an aqueous organic solvent (II) having compatibility with the organic solvent (I), and then, hydrating the polymer, and an ocular lens produced by the process, which is, in particular, remarkably excellent in transparency.

20 Claims, No Drawings

PROCESS FOR PRODUCING OCULAR LENS AND OCULAR LENS PRODUCED BY THE PROCESS

TECHNICAL FIELD

The present invention relates to a process for producing an ocular lens and an ocular lens produced by the process. More particularly, the present invention relates to a process for extremely easily producing an ocular lens such as a contact lens or an intraocular lens, which is, in particular, remarkably excellent in transparency, has flexibility and high oxygen permeability, is excellent in stain resistance and wettability, and furthermore has high safety, and relates to an ocular lens such as a contact lens, which is produced by the process.

BACKGROUND ART

Conventionally, in general, a material having relatively high water-absorptive property, such as a material having a water content of at least 40% by weight has the advantage of being imparted flexibility by water even if its own flexibility is, as usual, not so high. However, oxygen permeability of the above material is insufficient and when water content in the material is increased, there generates a problem that bacteria widely breed and safety of the material is lowered.

Then, there is proposed a material comprising a copolymer which is prepared by combining a monomer or macromonomer capable of imparting excellent oxygen permeability to the material, such as a silicon and/or fluorine-containing monomer or macromonomer with a hydrophilic monomer capable of imparting excellent wettability (hydrophilic property) to the material, such as a hydroxyl group-containing monomer so that water content of the material becomes low, and then, by copolymerizing these together with. Although the material is surely excellent in oxygen permeability, the material is poor in flexibility, and furthermore, because compatibility of the silicon and/or fluorine-containing monomer or macromonomer with the hydrophilic monomer is remarkably poor, when these components are mixed together with, sometimes phase separation is generated and only an opaque polymer is obtained by the copolymerization. Therefore, there occurs a problem that it is difficult to use the above material as a contact lens or an intraocular lens.

Then, in order to solve the above problem, there is proposed a process for producing a soft contact lens, comprising desilylating the copolymer prepared by copolymerizing a hydroxyl group-containing hydrophilic monomer of which hydroxyl group is previously silylated with a polyorganosiloxane having a polymerizable group and a hydrophilic group on the same side chain of the molecule (Japanese Unexamined Patent Publication No. 295216/1989).

By the above process, a soft contact lens which is excellent in transparency can be produced. However, because there is necessitated a complicated step such that hydroxyl group of a hydroxyl group-containing hydrophilic monomer is previously silylated and then, the obtained copolymer is desilylated, it is desired that the step in the process is more simplified.

Also, in addition to the above process, there are proposed a process for producing a contact lens, comprising mixing a monomer composition containing a crosslinking agent with a solvent having high compatibility with the monomer composition to give a mixture, producing a formed article of polymer by molding the mixture by the static casting and removing the solvent from the formed article of polymer (Japanese Unexamined Patent Publication No. 225913/1989), a process comprising using a monomer composition containing a silicone-containing monomer and a hydrophilic monomer in the above process for producing a contact lens (Japanese Unexamined Patent Publication No. 501504/1996) and a process comprising evaporating and removing the solvent at the specific temperature in the above process for producing a contact lens (Japanese Unexamined Patent Publication No 503173/1996).

By these processes, a contact lens which is relatively good in transparency can be produced. However, when these processes are employed, there is a fear that the solvent and non-reacted monomer composition which have been used during the static casting are not completely removed, so that these remain in a contact lens.

In the meantime, as an intraocular lens material, there is proposed a material prepared by polymerizing a silicon-containing monomer capable of imparting flexibility to the material.

However, the above material has a problem that a lens from the material becomes cloud in white owing to stain such as lipid after inserting the lens into an eye because the material has a high affinity for lipid, so that optical properties are lost. Then; in order to solve the problem, it is tried to develop various processes for producing an intraocular lens material. However, a process by which the desired intraocular lens can be easily produced has not been provided yet.

As aforementioned, there has not yet been provided a process for easily producing a contact lens material and an intraocular lens material which are, in particular, excellent in transparency and furthermore have flexibility, high oxygen permeability, stain resistance, wettability, safety and the like at the same time.

The present invention has been accomplished in consideration of the above prior art, and aims at providing a process for extremely easily producing an ocular lens such as a contact lens, which is, in particular, remarkably excellent in transparency, has flexibility and high oxygen permeability, is excellent in stain resistance and wettability, and furthermore has high safety, and providing an ocular lens represented by a contact lens, which is produced by the process.

DISCLOSURE OF THE INVENTION

The present invention relates to

① A process for producing an ocular lens characterized by mixing a polymerizable component for an ocular lens with an organic solvent (I) capable of dissolving the polymerizable component, injecting the obtained mixture into a mold having the desired shape for an ocular lens and then, preparing a polymer by the polymerization reaction, immersing the polymer taken off from the mold in an aqueous organic solvent (II) having compatibility with the organic solvent (I), and then, hydrating the polymer;

② an ocular lens produced by the above process;

③ A process for producing a contact lens characterized by mixing a polymerizable component for an ocular lens containing 20 to 50% by weight of a silicon-containing alkyl acrylate, 20 to 50% by weight of a polysiloxane macromonomer in which a polymerizable group bonds to a siloxane main chain through at least one urethane bond, and which is represented by the formula (II):

$$A^1-U^1 + S^1-U^2 \rangle_n S^2-U^3-A^2 \quad (II)$$

[wherein $A^1$ is a group represented by the formula (III):

$$Y^{21}—R^{31}— \quad (III)$$

in which $Y^{21}$ is acryloyloxy group and $R^{31}$ is a linear or branched alkylene group having 2 to 6 carbon atoms;

$A^2$ is a group represented by the formula (IV):

$$Y^{22}—R^{34}— \quad (IV)$$

in which $Y^{22}$ is acryloyloxy group and $R^{34}$ is a linear or branched alkylene group having 2 to 6 carbon atoms;

$U^1$l is a group represented by the formula (V):

$$—X^{21}—E^{21}—X^{25}—R^{32}— \quad (V)$$

in which $X^{21}$ is a covalent bond, oxygen atom or an alkylene glycol group, $E^{21}$ is —NHCO— group (in this case, $X^{21}$ is a covalent bond and an urethane bond is formed between $E^{21}$ and $X^{25}$) or a divalent group derived from a diisocyanate selected from a saturated aliphatic diisocyanate, an alicyclic diisocyanate and an aromatic diisocyanate (in this case, $X^{21}$ is oxygen atom or an alkylene glycol group and $E^{21}$ forms an urethane bond between $X^{21}$ and $X^{25}$), $X^{25}$ is oxygen atom or an alkylene glycol group, and $R^{32}$ is a linear or branched alkylene group having 1 to 6 carbon atoms;

each of $S^1$ and $S^2$ is independently a group represented by the formula (VI):

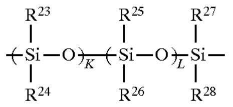

(VI)

in which each of $R^{23}$, $R^{24}$, $R^{25}$, $R^{26}$, $R^{27}$ and $R^{28}$ is independently an alkyl group having 1 to 3 carbon atoms or phenyl group, K is an integer of 1 to 1500, L is an integer of 0 to 1500, and (K+L) is an integer of 1 to 1500;

$U^2$ is a group represented by the formula (VII):

$$—R^{37}—X^{27}—E^{24}—X^{28}—R^{38}— \quad (VII)$$

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from a saturated aliphatic diisocyanate, an alicyclic diisocyanate and an aromatic diisocyanate (in this case, $E^{24}$ forms an urethane bond between $X^{27}$ and $X^{28}$);

$U^3$ is a group represented by the formula (VIII):

$$—R^{33}—X^{26}—E^{22}—X^{22}— \quad (VIII)$$

in which $R^{33}$ is a linear or branched alkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO— group (in this case, $X^{22}$ is a covalent bond and an urethane bond is formed between $E^{22}$ and $X^{26}$) or a divalent group derived from a diisocyanate selected from a saturated aliphatic diisocyanate, an alicyclic diisocyanate and an aromatic diisocyanate (in this case, $X^{22}$ is oxygen atom or an alkylene glycol group and $E^{22}$ forms an urethane bond between $X^{22}$ and $X^{26}$); and n is an integer of 1 to 10], 10 to 50% by weight of a hydroxyalkyl (meth)acrylate (B), and 0.01 to 10% by weight of a crosslinkable compound (C) having at least two polymerizable groups with at least one member of butanol and pentanol which can dissolve the polymerizable component, injecting the obtained mixture into a mold having the desired shape for a contact lens and then, preparing a polymer by the polymerization reaction, immersing the polymer taken off from the mold in at least one member of ethanol and propanol which have compatibility with at least one member of butanol and pentanol, and then, hydrating the polymer; and (4) a contact lens produced by the above process.

BEST MODE FOR CARRYING OUT THE INVENTION

In the process for producing an ocular lens of the present invention, firstly, a polymerizable component for an ocular lens is mixed with an organic solvent (I) capable of dissolving the polymerizable component.

The kinds of the polymerizable component for an ocular lens used in the present invention can be suitably selected in accordance with properties of the desired ocular lens and the like.

For instance, in order to more improve transparency of the obtained ocular lens and impart excellent oxygen permeability and stain resistance to the ocular lens at the same time, it is desired that the polymerizable component is, for instance, a component containing at least one member of a polymerizable silicon-containing compound (A-1) and a polymerizable fluorine-containing compound (A-2), and a hydroxyalkyl (meth)acrylate (B), as main components.

Moreover, in the present specification, the component containing at least one member of the polymerizable silicon-containing compound (A-1) and the polymerizable fluorine-containing compound (A-2), and the hydroxyalkyl (meth) acrylate (B), as main components is a polymerizable component in which the total content of both components is at least 50% by weight.

Also, in the present specification, the terminology of "... (meth)acry ..." means at least one member of "... acry ..." and "... methacry ...".

The above polymerizable silicon-containing compound (A-1) is a component mainly used for imparting oxygen permeability to an ocular lens.

Typical examples of the polymerizable silicon-containing compound (A-1) are, for instance, a silicon-containing (meth)acrylate such as a silicon-containing alkyl (meth) acrylate such as pentamethyldisiloxanylmethyl (meth) acrylate, trimethylsiloxydimethylsilylpropyl (meth)acrylate, methylbis(trimethylsiloxy)silylpropyl (meth)acrylate, tris (trimethylsiloxy)silylpropyl (meth)acrylate, mono [methylbis(trimethylsiloxy)siloxy]bis(trimethylsiloxy) silylpropyl (meth)acrylate, tris[methylbis(trimethylsiloxy) siloxy]silylpropyl (meth)acrylate, trimethylsilylmethyl (meth)acrylate, trimethylsilylpropyl (meth)acrylate, methylbis(trimethylsiloxy) silylethyltetramethyldisiloxanylmethyl (meth)acrylate, tetramethyltriisopropylcyclotetrasiloxanylpropyl (meth) acrylate, tetramethyltriisopropylcyclotetrasiloxybis (trimethylsiloxy)silylpropyl (meth)acrylate or trimethylsiloxydimethylsilylpropyl (meth)acrylate, or a silicon-containing alkylglyceroyl (meth)acrylate such as methylbis(trimethylsiloxy)silylpropylglyceroyl (meth)

acrylate, tris(trimethylsiloxy)silylpropylglyceroyl (meth) acrylate, mono[methylbis(trimethylsiloxy)siloxy]bis (trimethylsiloxy)silylpropylglyceroyl (meth) acrylate, trimethylsilylethyltetramethyldisiloxanylpropylglyceroyl (meth) acrylate, trimethylsilylpropylglyceroyl (meth)acrylate or pentamethyldisiloxanylpropylglyceroyl (meth)acrylate; a silicon-containing styrene derivative represented by the formula (I):

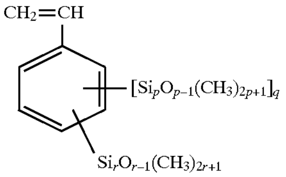

(I)

wherein p is an integer of 1 to 15, q is 0 or 1 and r is an integer of 1 to 15; and the like. Moreover, as to the silicon-containing styrene derivative represented by the formula (I), when p or r in the formula (I) is an integer of at least 16, there is a tendency that it is difficult to synthesize and purify the derivative. When q in the formula (I) is an integer of at least 2, there is a tendency that it is difficult to synthesize the silicon-containing styrene derivative.

Typical examples of the above silicon-containing styrene derivative represented by the formula (I) are, for instance, tris (trimethylsiloxy)silylstyrene, methylbis (trimethylsiloxy)silylstyrene, dimethylsilylstyrene, trimethylsilylstyrene, tris(trimethylsiloxy) siloxanyldimethylsilylstyrene, [methylbis(trimethylsiloxy) siloxanyl]dimethylsilylstyrene, pentamethyldisiloxanylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris (pentamethyldisiloxy)silylstyrene, [tris(trimethylsiloxy) siloxanyl]bis(trimethylsiloxy)silylstyrene, methylbis (heptamethyltrisiloxy)silylstyrene, tris[methylbis (trimethylsiloxy)siloxy]silylstyrene, trimethylsiloxybis[tris (trimethylsiloxy)siloxy]silylstyrene, heptakis (trimethylsiloxy)trisiloxanylstyrene, tris[tris (trimethylsiloxy)siloxy]silylstyrene, [tris(trimethylsiloxy) hexamethyltetrasiloxy][tris(trimethylsiloxy)siloxy] trimethylsiloxysilylstyrene, nonakis(trimethylsiloxy) tetrasiloxanylstyrene, methylbis(tridecamethylhexasiloxy) silylstyrene, heptamethylcyclotetrasiloxanylstyrene, heptamethylcyclotetrasiloxybis(trimethylsiloxy) silylstyrene, tripropyltetramethylcyclotetrasiloxanylstyrene and the like.

Also, in addition to the above examples, as the polymerizable silicon-containing compound (A-1), there are exemplified a siloxanyl origomer such as a polysiloxane macromonomer in which a polymerizable group bonds to a siloxane main chain through at least one urethane bond, and which is represented by the formula (II):

$$A^1—U^1—(S^1—U^2)_n—S^2—U^3—A^2 \quad (II)$$

[wherein $A^1$ is a group represented by the formula (III):

$$Y^{21}—R^{31}— \quad (III)$$

in which $Y^{21}$ is acryloyloxy group and $R^{31}$ is a linear or branched alkylene group having 2 to 6 carbon atoms;

$A^2$ is a group represented by the formula (IV):

$$Y^{22}—R^{34}— \quad (IV)$$

in which $Y^{22}$ is acryloyloxy group and $R^{34}$ is a linear or branched alkylene group having 2 to 6 carbon atoms;

$U^1$ is a group represented by the formula (V):

$$—X^{21}—E^{21}—X^{25}—R^{32}— \quad (V)$$

in which $X^{21}$ is a covalent bond, oxygen atom or an alkylene glycol group, $E^{21}$ is —NHCO— group (in this case, $X^{21}$ is a covalent bond and an urethane bond is formed between $E^{21}$ and $X^{25}$) or a divalent group derived from a diisocyanate selected from a saturated aliphatic diisocyanate, an alicyclic diisocyanate and an aromatic diisocyanate (in this case, $X^{21}$ is oxygen atom or an alkylene glycol group and $E^{21}$ forms an urethane bond between $X^{21}$ and $X^{25}$), $X^{25}$ is oxygen atom or an alkylene glycol group, and $R^{32}$ is a linear or branched alkylene group having 1 to 6 carbon atoms;

each of $S^1$ and $S^2$ is independently a group represented by the formula (VI):

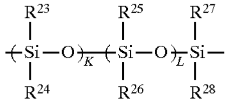

(VI)

in which each of $R^{23}$, $R^{24}$, $R^{25}$, $R^{26}$, $R^{27}$ and $R^{28}$ is independently an alkyl group having 1 to 3 carbon atoms or phenyl group, K is an integer of 1 to 1500, L is an integer of 0 to 1500, and (K+L) is an integer of 1 to 1500;

$U^2$ is a group represented by the formula (VII):

$$—R^{37}—X^{27}—E^{24}—X^{28}—R^{38}— \quad (VII)$$

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from a saturated aliphatic diisocyanate, an alicyclic diisocyanate and an aromatic diisocyanate (in this case, $E^{24}$ forms an urethane bond between $X^{27}$ and $X^{28}$);

$U^3$ is a group represented by the formula (VIII):

$$—R^{33}—X^{26}—E^{22}—X^{22}— \quad (VIII)$$

in which $R^{33}$ is a linear or branched alkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO— group (in this case, $X^{22}$ is a covalent bond and an urethane bond is formed between $E^{22}$ and $X^{26}$) or a divalent group derived from a diisocyanate selected from a saturated aliphatic diisocyanate, an alicyclic diisocyanate and an aromatic diisocyanate (in this case, $X^{22}$ is oxygen atom or an alkylene glycol group and $E^{22}$ forms an urethane bond between $X^{22}$ and $X^{26}$); and n is an integer of 1 to 10];

a polysiloxane macromonomer having polymerizable groups in its both ends, which is represented by the formula (IX):

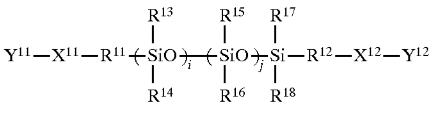

(IX)

[wherein each of $Y^{11}$ and $Y^{12}$ is independently acryloyl group, methacryloyl group, vinyl group or allyl group, each of $X^{11}$ and $X^{12}$ is independently a covalent bond, oxygen atom or an alkylene glycol group, each of $R^{11}$ and $R^{12}$ is independently a linear or branched alkylene group having 1 to 6 carbon atoms, each of $R^{13}$, $R^{14}$, $R^{15}$, $R^{16}$, $R^{17}$ and $R^{18}$ is independently an alkylene group having 1 to 3 carbon atoms or phenyl group, i is an integer of 1 to 1500, and j is an integer of 0 to 1499 (also, (i+j)≦1500)]; or a polysiloxane macromonomer in which a polymerizable group bonds to a siloxane main chain through one or two urethane bonds, and which is represented by the formula (X):

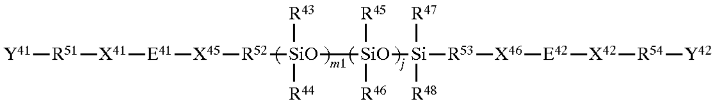

(X)

[wherein each of $Y^{41}$ and $Y^{42}$ is independently acryloyl group, methacryloyl group, vinyl group or allyl group, each of $R^{51}$ and $R^{54}$ is independently a linear or branched alkylene group having 2 to 6 carbon atoms, each of $X^{41}$ and $X^{42}$ is independently a covalent bond, oxygen atom or an alkylene glycol, each of $R^{52}$ and $R^{53}$ is independently a linear or branched alkylene group having 1 to 6 carbon atoms, each of $R^{43}$, $R^{44}$, $R^{45}$, $R^{46}$, $R^{47}$ and $R^{48}$ is independently an alkyl group having 1 to 3 carbon atoms or phenyl group, each of $E^{41}$ and $E^{42}$ is independently —NHCO— (in this case, $X^{41}$ and $X^{42}$ are covalent bonds, an urethane bond is formed between $E^{41}$ and $X^{45}$, and an urethane bond is formed between $E^{42}$ and $X^{46}$) or a divalent group derived from a diisocyanate selected from a saturated aliphatic diisocyanate, an alicyclic diisocyanate and an aromatic diisocyanate (in this case, each of $X^{41}$ and $X^{42}$ is independently oxygen atom or an alkylene glycol group, $E^{41}$ forms an urethane bond between $X^{41}$ and $X^{45}$, and $E^{42}$ forms an urethane bond between $X^{42}$ and $X^{46}$), each of $X^{45}$ and $X^{46}$ is independently oxygen atom, an alkylene glycol group or a group represented by the formula (XI):

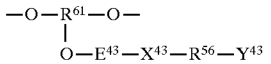

(XI)

in which $R^{61}$ is a trivalent hydrocarbon group having 1 to 6 carbon atoms, $Y^{43}$ is acryloyloxy group, methacryloyloxy group, vinyl group or allyl group, $R^{56}$ is a linear or branched alkylene group having 2 to 6 carbon atoms, $X^{43}$ is a covalent bond, oxygen atom or an alkylene glycol group, $E^{43}$ is —NHCO— (in this case, $X^{43}$ is a covalent bond) or a divalent group derived from a diisocyanate selected from a saturated aliphatic diisocyanate, an alicyclic diisocyanate and an aromatic diisocyanate (in this case, $X^{43}$ is oxygen atom or an alkylene glycol group) and in which each of $X^{45}$ and $X^{46}$ forms an urethane bond between neighboring oxygen atom bonding to $R^{61}$ and $X^{43}$, m1 is an integer of 1 to 1500, and m2 is an integer of 0 to 1499 (also, (m1+m2) ≦1500)]; and the like.

The above polymerizable silicon-containing compound (A-1) can be used alone or in an admixture thereof.

From the viewpoint that effect of imparting high oxygen permeability and flexibility to the ocular lens at the same time is large, the silicon-containing (meth)acrylate is preferable, and the silicon-containing alkyl acrylate is more preferable, and tris(trimethylsiloxy)silylpropyl acrylate and the like are particularly preferable among the above polymerizable silicon-containing compounds (A-1).

Also, from the viewpoint that effect of imparting mechanical strength and flexibility to the ocular lens at the same time is large, the above polysiloxane macromonomer in which a polymerizable group bonds to a siloxane main chain through at least one urethane bond, represented by the formula (II) is preferable.

As mentioned above, in the present invention, it is desired that the silicon-containing alkyl acrylate and the polysiloxane macromonomer in which a polymerizable group bonds to a siloxane main chain through at least one urethane bond, represented by the formula (II) are used at the same time among the polymerizable silicon-containing compounds (A-1).

The above polymerizable fluorine-containing compound (A-2) is a component used for mainly improving mechanical strength of the ocular lens and furthermore, improving stain resistance of the ocular lens.

Typical examples of the polymerizable fluorine-containing compound (A-2) are, for instance, a fluorine-containing (meth)acrylate represented by the formula (XII):

$$CH_2{=}CR^1COOC_sH_{(2s-t-u+1)}F_t(OH)_u \quad \text{(XII)}$$

wherein $R^1$ is hydrogen atom or $CH_3$, s is an integer of 1 to 15, t is an integer of 1 to (2s+1) and u is an integer of 0 to 2; and the like.

Typical examples of the above fluorine-containing (meth) acrylate represented by the formula (XII) are, for instance, 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth) acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,5,6,6,7,7,8,9,9,9-dodecafluoro-8-trifluoromethylnonyl (meth)acrylate, 2-hydroxy-4,4,5,5,6,6,7,7,8,8,9,9,10,11,11,11-hexadecafluoro-10-trifluoromethylundecyl (meth)acrylate and the like. These can be used alone or in an admixture thereof.

From the viewpoints that effect of improving mechanical strength and stain resistance of the ocular lens is large and that handling is easy, 2,2,2-trifluoroethyl (meth)acrylate and 2,2,2,2',2',2'-hexafluoroisopropyl (meth)acrylate are preferable among the above fluorine-containing (meth)acrylates.

In order to sufficiently impart oxygen permeability to the ocular lens, it is desired that the amount of at least one member of the above polymerizable silicon-containing compound (A-1) and the polymerizable fluorine-containing compound (A-2) in the polymerizable component is at least 3% by weight, preferably at least 5% by weight. Also, in order to remove a fear that stain resistance and shape stability of the ocular lens are lowered, it is desired that the amount of at least one member of the polymerizable silicon-containing compound (A-1) and the polymerizable fluorine-containing compound (A-2) in the polymerizable component is at most 85% by weight, preferably at most 80% by weight.

The above hydroxyalkyl (meth)acrylate (B) is a component used for mainly imparting, in particular, stain resistance such as lipid-stain resistance and hydrophilic property to the ocular lens.

Typical examples of the hydroxyalkyl (meth)acrylate (B) are, for instance, a hydroxyalkyl (meth)acrylate having an alkyl group having 1 to 10 carbon atoms, such as 2-hydroxyethyl (meth)acrylate, 2-hydroxypropyl (meth) acrylate, 2,3-dihydroxypropyl (meth)acrylate or 2,3-dihydroxy-2-methylpropyl (meth)acrylate; and the like. These can be used alone or in an admixture thereof.

From the viewpoints that effect of imparting stain resistance and hydrophilic property to the ocular lens is large and that handling is easy, 2-hydroxyethyl (meth)acrylate, 2-hydroxypropyl (meth)acrylate, 2,3-dihydroxypropyl (meth)acrylate and 2,3-dihydroxy-2-methylpropyl (meth) acrylate are preferable among the above hydroxyalkyl (meth)acrylates (B).

In order to sufficiently impart stain resistance and hydrophilic property to the ocular lens, it is desired that the amount of the above hydroxyalkyl (meth)acrylate (B) in the polymerizable component is at least 10% by weight, preferably at least 15% by weight. Also, in order to remove a fear that oxygen permeability of the ocular lens is lowered, it is desired that the amount of the hydroxyalkyl (meth)acrylate (B) in the polymerizable component is at most 95% by weight, preferably at most 90% by weight.

Furthermore, for instance, in order to impart excellent shape stability to the ocular lens in addition to excellent oxygen permeability and stain resistance and in order to more improve optical property such as transparency of the ocular lens, it is desired that a crosslinkable compound (C) having at least two polymerizable groups is contained in the polymerizable component in addition to at least one member of the above polymerizable silicon-containing compound (A-1) and the polymerizable fluorine-containing compound (A-2), and the hydroxyalkyl (meth)acrylate (B).

Typical examples of the above crosslinkable compound (C) are, for instance, ethylene glycol di(meth)acrylate, diethylene glycol di(meth)acrylate, triethylene glycol di(meth) acrylate, propylene glycol di(meth)acrylate, dipropylene glycol di(meth)acrylate, allyl (meth)acrylate, vinyl (meth) acrylate, trimethylolpropane tri(meth)acrylate, methacryloyloxyethyl acrylate, divinylbenzene, diallyl phthalate, diallyl adipate, triallylisocyanurate, α-methylene-N-vinylpyrrolidone, 4-vinylbenzyl (meth)acrylate, 3-vinylbenzyl (meth)acrylate, 2,2-bis(p-(meth) acryloyloxyphenyl)hexafluoropropane, 2,2-bis(m-(meth) acryloyloxyphenyl)hexafluoropropane, 2,2-bis(o-(meth) acryloyloxyphenyl)hexafluoropropane, 2,2-bis(p-(meth) acryloyloxyphenyl) propane, 2,2-bis(m-(meth) acryloyloxyphenyl)propane, 2,2-bis(o-(meth) acryloyloxyphenyl)propane, 1,4-bis(2-(meth) acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxyisopropyl)benzene, 1,3-bis(2-(meth) acryloyloxyisopropyl)benzene, 1,2-bis(2-(meth) acryloyloxyisopropyl)benzene and the like. These can be used alone or in an admixture thereof.

From the viewpoints that effect of imparting shape stability to the ocular lens and effect of improving optical property of the ocular lens are large, and that handling is easy, ethylene glycol di(meth)acrylate is preferable among the above crosslinkable compound (C).

In order to sufficiently impart shape stability to the ocular lens and sufficiently improve optical property of the ocular lens, it is desired that the amount of the above crosslinkable compound (C) in the polymerizable component is at least 0.01% by weight, preferably at least 0.05% by weight. Also, in order to remove a fear that flexibility of the ocular lens is remarkably lowered owing to too heightened hardness thereof, it is desired that the amount of the crosslinkable compound (C) in the polymerizable component is at most 10% by weight, preferably at most 5% by weight.

Furthermore, in the present invention, in accordance with properties of the desired ocular lens, a polymerizable compound (D) copolymerizable with at least one member of the polymerizable silicon-containing compound (A-1) and the polymerizable fluorine-containing compound (A-2) and the hydroxyalkyl (meth)acrylate (B) can be contained in the polymerizable component in addition to at least one member of the above polymerizable silicon-containing compound (A-1) and the polymerizable fluorine-containing compound (A-2), the hydroxyalkyl (meth)acrylate (B) and the crosslinkable compound (C).

For instance, in order to make the ocular lens hard or soft by adjusting hardness of the ocular lens, there are preferably used as the polymerizable compound (D), for instance, linear, branched or cyclic alkyl (meth)acrylate, alkoxyalkyl (meth)acrylate and alkylthioalkyl (meth)acrylate such as methyl (meth)acrylate, ethyl (meth)acrylate, isopropyl (meth)acrylate, n-propyl (meth)acrylate, isobutyl (meth) acrylate, n-butyl (meth)acrylate, 2-ethylhexyl (meth) acrylate, n-octyl (meth)acrylate, n-decyl (meth)acrylate, n-dodecyl (meth)acrylate, t-butyl (meth)acrylate, pentyl (meth)acrylate, t-pentyl (meth)acrylate, hexyl (meth) acrylate, heptyl (meth)acrylate, nonyl (meth)acrylate, stearyl (meth)acrylate, cyclopentyl (meth)acrylate, cyclohexyl (meth)acrylate, 2-ethoxyethyl (meth)acrylate, 3-ethoxypropyl (meth)acrylate, 2-methoxyethyl (meth) acrylate, 3-methoxypropyl (meth)acrylate, ethylthioethyl (meth)acrylate and methylthioethyl (meth)acrylate; styrene; α-methylstyrene; an alkylstyrene such as methylstyrene, ethylstyrene, propylstyrene, butylstyrene, t-butylstyrene, isobutylstyrene or pentylstyrene; an alkyl-α-methylstyrene such as methyl-α-methylstyrene, ethyl-α-methylstyrene, propyl-α-methylstyrene, butyl-α-methylstyrene, t-butyl-α-methylstyrene, isobutyl-α-methylstyrene or pentyl-α-methylstyrene; and the like. These can be used alone or in an admixture thereof.

Also, in order to improve compatibility of at least one member of the above polymerizable silicon-containing compound (A-1) and the polymerizable fluorine-containing compound (A-2) with the hydroxyalkyl (meth)acrylate (B) and in order to more impart hydrophilic property to the obtained ocular lens, there are preferably used as the polymerizable compound (D), for instance, an (alkyl)aminoalkyl (meth)acrylate such as 2-dimethylaminoethyl (meth) acrylate or 2-butylaminoethyl (meth)acrylate; an alkyl (meth)acrylamide such as N,N-dimethyl(meth)acrylamide, N,N-diethyl(meth)acrylamide or N,N-methylethyl(meth) acrylamide; an alkylene glycol mono(meth)acrylate such as propylene glycol mono(meth)acrylate; a N-vinyllactam such as N-vinylpyrrolidone; (meth)acrylic acid; maleic anhydride; fumaric acid; a fumaric acid derivative; aminostyrene; hydroxystyrene; and the like. These can be used alone or in an admixture thereof.

The amount of the above polymerizable compound (D) in the polymerizable component may be suitably adjusted so that the total amount of the polymerizable component becomes to 100% by weight. When at least one member of the above polymerizable silicon-containing compound (A-1) and the polymerizable fluorine-containing compound (A-2), the hydroxyalkyl (meth)acrylate (B), the crosslinkable compound (C) and the polymerizable compound (D) are used at the same time, in order to remove a fear that effects based on at least one member of the polymerizable silicon-containing compound (A-1) and the polymerizable fluorine-containing compound (A-2), the hydroxyalkyl (meth)acrylate (B) and the crosslinkable compound (C) are not sufficiently exhibited because the amount of these components is too lowered, it is desired that the amount of the polymerizable compound (D) in the polymerizable component is at most 50% by weight, preferably at most 45% by weight. Also, in order to sufficiently exhibit effects based on the polymerizable compound (D), it is desired that the amount of the polymerizable compound (D) in the polymerizable component is at least 1.5% by weight, preferably at least 3% by weight.

Moreover, in the process for producing a contact lens of the present invention, in particular, as the polymerizable component for an ocular lens, there is used a polymerizable component (hereinafter referred to as "polymerizable component (α)") containing 20 to 50% by weight of the silicon-containing alkyl acrylate, 20 to 50% by weight of the polysiloxane macromonomer in which a polymerizable group bonds to a siloxane main chain through at least one urethane bond, represented by the formula (II), 10 to 50% by weight of the hydroxyalkyl (meth)acrylate (B) and 0.01 to 10% by weight of the crosslinkable compound (C) having at least two polymerizable groups.

From the viewpoint that effect of imparting high oxygen permeability and flexibility to the contact lens at the same time is larger, tris(trimethylsiloxy)silylpropyl acrylate is particularly preferable among the above silicon-containing alkyl acrylates.

In order to sufficiently impart oxygen permeability and flexibility to the contact lens, the amount of the silicon-containing alkyl acrylate in the polymerizable component (α) is at least 20% by weight, preferably at least 25% by weight. Also, in order to remove a fear that shape stability of the contact lens is lowered, the amount of the silicon-containing alkyl acrylate in the polymerizable component (α) is at most 50% by weight, preferably at most 45% by weight.

In order to sufficiently impart mechanical strength and flexibility to the contact lens, the amount of the above polysiloxane macromonomer in the polymerizable component (α) is at least 20% by weight, preferably at least 25% by weight. Also, in order to remove a fear that shape stability of the contact lens is lowered, the amount of the polysiloxane macromonomer in the polymerizable component (α) is at most 50% by weight, preferably at most 45% by weight.

From the viewpoint that effect of imparting stain resistance and hydrophilic property to the contact lens is larger, hydroxyethyl (meth)acrylate is particularly preferable among the above hydroxyalkyl (meth)acrylates (B).

In order to sufficiently impart stain resistance and hydrophilic property to the contact lens, the amount of the hydroxyalkyl (meth)acrylate (B) in the polymerizable component (α) is at least 10% by weight, preferably at least 15% by weight. Also, in order to remove a fear that oxygen permeability of the contact lens is lowered, the amount of the hydroxyalkyl (meth)acrylate (B) in the polymerizable component (α) is at most 50% by weight, preferably at most 45% by weight.

In order to sufficiently impart shape stability to the contact lens and sufficiently improve optical property of the contact lens, the amount of the above crosslinkable compound (C) in the polymerizable component (α) is at least 0.01% by weight, preferably at least 0.05% by weight. Also, in order to remove a fear that flexibility of the contact lens is remarkably lowered because the contact lens becomes too hard, the amount of the crosslinkable compound (C) in the polymerizable component (α) is at most 10% by weight, preferably at most 5% by weight.

Moreover, in the process for producing an ocular lens and the process for producing a contact lens of the present invention, a radical polymerization initiator, a photo polymerization initiator, a photo polymerization sensitizer and the like may be added to the polymerizable component and the polymerizable component (α) in which the kinds and amount of each component are suitably adjusted, in accordance with the following polymerization method such as a thermal polymerization method or a photo polymerization method.

Typical examples of the above radical polymerization initiator are, for instance, azobisisobutyronitrile, azobisdimethylvaleronitrile, benzoyl peroxide, t-butyl hydroperoxide, cumene peroxide and the like.

Typical examples of the above photo polymerization initiator are, for instance, a benzoin photo polymerization initiator such as methyl orthobenzoylbenzoate, methyl benzoylformate, benzoin methyl ether, benzoin ethyl ether, benzoin isopropyl ether, benzoin isobutyl ether or benzoin n-butyl ether; a phenone photo polymerization initiator such as 2-hydroxy-2-methyl- 1-phenylpropane-1-one, p-isopropyl-α-hydroxyisobutylphenone, p-t-butyltrichloroacetophenone, 2,2-dimethoxy-2-phenylacetophenone, α,α-dichloro-4-phenoxyacetophenone or N,N-tetraethyl-4,4-diaminobenzophenone; 1-hydroxycyclohexyl phenyl ketone; 1-phenyl- 1,2-propanedione-2-(o-ethoxycarbonyl)oxime; a thioxanthone photo polymerization initiator such as 2-chlorothioxanthone or 2-methylthioxanthone; dibenzosvarron; 2-ethylanthraquinone; benzophenone acrylate; benzophenone; benzil; and the like.

Typical examples of the above photo polymerization sensitizer are, for instance, 1,2-benzoanthraquinone and the like.

The radical polymerization initiator, the photo polymerization initiator, the photo polymerization sensitizer and the like may be used by suitably selecting one member or at least two members from the above exemplified ones. It is desired that the amount of these initiators and sensitizer is 0.002 to 2 parts (part(s) by weight, hereinafter referred to as same) or so, preferably 0.01 to 1 part or so based on 100 parts of the total amount of the polymerizable component.

Next, in the process for producing an ocular lens of the present invention, the above polymerizable component is mixed with an organic solvent (I) capable of dissolving the polymerizable component.

Because the above organic solvent (I) can dissolve the polymerizable component for an ocular lens used in the present invention, a mixture obtained by mixing both together with is homogenized and generates no phase separation during the following polymerization reaction, and the obtained polymer does not become cloud in white.

Typical examples of the organic solvent (I) are, for instance, an alcohol having 1 to 12 carbon atoms, such as ethanol, propanol, butanol, pentanol, hexanol, octanol or decanol; a ketone having 2 to 4 carbon atoms, such as acetone or methyl ethyl ketone; acetonitrile, chloroform and the like. The organic solvent (I) may be used by suitably selecting a member capable of dissolving the used polymerizable components in accordance with the kinds of the polymerizable components. Also, these can be used alone or in an admixture thereof.

From the viewpoint that solubilizing property for the polymerizable components such as at least one member of the polymerizable silicon-containing compound (A-1) and the polymerizable fluorine-containing compound (A-2), and the hydroxyalkyl (meth)acrylate (B) is particularly excellent, the alcohol having 1 to 12 carbon atoms and the ketone having 2 to 4 carbon atoms are preferable among the above organic solvents (I).

As to the mixing ratio of the above polymerizable component to the organic solvent (I), it is desired that the weight ratio of the polymerizable component to the organic solvent (I) (polymerizable component/organic solvent (I)) is at most 90/10, preferably at most 88/12 so that the polymerizable component is sufficiently dissolved in the organic solvent (I). Also, in order to remove a fear that it becomes hard for the obtained polymer to show compatibility with the following organic solvent (II) because the amount of the residual organic solvent (I) in the polymer is too large, it is desired that the above weight ratio is at least 10/90, preferably at least 12/88.

Moreover, particularly, in the process for producing a contact lens of the present invention, at least one member of butanol and pentanol is used as an organic solvent (I) capable of dissolving the polymerizable component ($\alpha$), and the polymerizable component ($\alpha$) is mixed with at least one member of butanol and pentanol.

In the process for producing a contact lens of the present invention, in order to improve copolymerizable property of the silicon-containing alkyl acrylate and the polysiloxane macromonomer with the hydroxyalkyl (meth)acrylate (B), at least one member of butanol and pentanol is used. Also, in order to prevent evaporation of the organic solvent (I) owing to exothermic reaction during the following polymerization reaction, it is desired that a solvent of which boiling point is at least 40° C. or so, preferably at least 100° C. or so is used as the organic solvent (I). Also, in order to prevent deformation of a contact lens owing to heating while the solvent is removed, it is desired that a solvent of which boiling point is at most 150° C. or so is used as the organic solvent (I). Therefore, from the above viewpoints, at least one member of butanol (boiling point: 117° C.) and pentanol (boiling point: 102° to 137° C.) is used as the organic solvent (I) mixed with the polymerizable component ($\alpha$).

In the process for producing a contact lens of the present invention, as to the mixing ratio of the above polymerizable component ($\alpha$) to at least one member of butanol and pentanol, it is desired that the weight ratio of the polymerizable component ($\alpha$) to at least one member of butanol and pentanol (polymerizable component ($\alpha$)/at least one member of butanol and pentanol) is at most 75/25, preferably at most 70/30 so that the polymerizable component ($\alpha$) is sufficiently dissolved in at least one member of butanol and pentanol. Also, in order to remove a fear that it becomes hard for the obtained polymer to show compatibility with at least one member of ethanol and propanol used as the following organic solvent (II) because the amount of at least one member of residual butanol and residual pentanol in the polymer is too large, it is desired that the above weight ratio is at least 40/60, preferably at least 45/55.

Next, in the process for producing an ocular lens and the process for producing a contact lens of the present invention, a mixture obtained by mixing the polymerizable component with the organic solvent (I) is injected into a mold having the desired shape for an ocular lens and then, the polymerization reaction is carried out to prepare a polymer.

The above mold may be a mold having the desired shape for an ocular lens such as a contact lens or an intraocular lens. Moreover, in order to produce an intraocular lens, a mold having a shape corresponding to a one-piece intraocular lens in which an optic and haptics are united with each other may be used, and also, a mold having a shape corresponding to the optic and a mold having a shape corresponding to the haptics may be used.

After the mixture of the polymerizable component and the organic solvent (I) is injected into the mold, the polymerization reaction is carried out to prepare a polymer. A method of the polymerization reaction is not particularly limited and usual methods can be employed.

Examples of the above method of the polymerization reaction are, for instance, a method (thermal polymerization method) comprising firstly heating a mixture of the above polymerizable component to which the radical polymerization initiator is added and the organic solvent (I) at 30° to 60° C. or so for several hours to several tens of hours to polymerize the polymerizable component and then, completing the polymerization by successively increasing the temperature to 120° to 140° C. or so for several hours to ten and several hours; a method (photo polymerization method) comprising irradiating a ray such as ultraviolet-ray, having a wavelength corresponding to the absorption band of activity of the photo polymerization initiator to a mixture of the above polymerizable component to which the above photo polymerization initiator is added and the organic solvent (I) to polymerize the polymerizable component; a method comprising carrying out the polymerization by using the combination of the thermal polymerization method and the photo polymerization method; and the like.

Moreover, when the above thermal polymerization method is employed, the heating may be carried out in a constant temperature bath or a constant temperature chamber, and an electromagnetic wave such as microwave may be used, and also, the heating may be carried out stepwise. Also, when the above photo polymerization method is employed, the above photo polymerization sensitizer may be more added to the mixture.

Next, in the process for producing an ocular lens of the present invention, the thus obtained polymer is taken off from the mold and immersed in an aqueous organic solvent (II) having compatibility with the organic solvent (I).

The present invention is largely characterized by immersing the polymer in the aqueous organic solvent (II) having compatibility with the organic solvent (I).

The obtained polymer contains non-reacted polymerizable components in addition to the organic solvent (I) used during the polymerization reaction. However, when the polymer is immersed in the aqueous organic solvent (II) having compatibility with the organic solvent (I), the organic solvent (II) permeates into the polymer, and the organic solvent (II) and the organic solvent (I) contained in the polymer are dissolved with each other to dilute the organic solvent (I) in the polymer, and then, the non-reacted polymerizable components in the polymer elutes into the organic solvent (II).

Accordingly, in the present invention, there are no fears that phase separation and cloud in white occur because of the residual non-reacted polymerizable components and the organic solvent (I) during the polymerization reaction in the polymer, and that cloud in white occurs because of the residual organic solvent (II) in the polymer, so that safety of the obtained ocular lens is improved, differentiated from a conventional case that the solution polymerization is carried out by simply using an organic solvent.

The organic solvent (II) is, as mentioned above, a solvent having compatibility with the organic solvent (I), which is used for diluting the organic solvent (I). Also, as mentioned after, even if the organic solvent (II) is not completely removed and slightly remains in the polymer, the organic solvent (II) is an aqueous solvent so that it can be completely removed by the next hydration of the polymer. Furthermore, it is desired that the organic solvent (II) is a solvent having high volatility and relatively lower boiling point of, for instance, at most 100° C. or so.

Typical examples of the organic solvent (II) are, for instance, an alcohol having 1 to 3 carbon atoms, such as methanol, ethanol or propanol; a ketone having 2 to 4 carbon atoms, such as acetone or methyl ethyl ketone; and the like. These can be used alone or in an admixture thereof. Moreover, the kinds of the organic solvent (II) may be the same as the kinds of the above organic solvent (I) or different from the kinds of the organic solvent (I), and there are no limitations.

From the viewpoints that compatibility with the organic solvent (I) is excellent, that compatibility with the polymerizable components such as, in particular, the polymerizable silicon-containing compound (A) and the hydroxyalkyl (meth)acrylate (B) is excellent and that non-reacted polymerizable components easily elute, an alcohol having 1 to 3 carbon atoms and a ketone having 2 to 4 carbon atoms are preferable among the above organic solvents (II).

The time for immersing the polymer in the organic solvent (II) varies according to the kinds of the polymer and cannot unconditionally determined. It is desired that the time is a necessary time for reducing the amount of the non-reacted polymerizable component contained in the finally obtained ocular lens to at most 5% by weight and for sufficiently diluting the organic solvent (I) in the polymer, such as 40 to 100 minutes or so.

Also, when the above polymer is immersed in the organic solvent (II), in order to accelerate elution of the organic solvent (I) and the like into the organic solvent (II), air may be introduced into the organic solvent (II) by, for instance, the following methods.

Moreover, in the process for producing a contact lens of the present invention, in particular, there is used, as the organic solvent (II), at least one member of ethanol and propanol which have compatibility with at least one member of butanol and pentanol as the organic solvent (I), and the polymer taken off from the mold is immersed in at least one member of ethanol and propanol.

In the process for producing a contact lens of the present invention, because at least one member of butanol and pentanol in the polymer is more effectively diluted and non-reacted polymerizable components ($\alpha$) largely containing, in particular, silicon-containing components in the polymer more effectively elute, at least one member of ethanol and propanol is used. Accordingly, there is used at least one member of ethanol and propanol which is excellent in compatibility with at least one member of butanol and pentanol, immediately and easily removed during the hydration of the polymer as the next step, and shows high water-soluble property.

Moreover, the time for immersing the above polymer in at least one member of ethanol and propanol is not particularly limited and may be about the same as in the above process for producing an ocular lens.

Next, in the process for producing an ocular lens and the process for producing a contact lens of the present invention, it is desired that after the above polymer is immersed in the organic solvent (II), the polymer is dried before hydrating the polymer.

In the case that the polymer is dried, there are advantage that the organic solvent (I) which possibly remains in the polymer is more surely removed and that the organic solvent (II) which permeates into the polymer is sufficiently removed. In particular, in the process for producing a contact lens, because there is used, as the organic solvent (II), at least one member of ethanol (boiling point: 79° C.) and propanol (boiling point: 82° C.) which have lower boiling point, when the polymer is dried, the boiling point of at least one member of ethanol and propanol own is lowered based on azeotropic effects of at least one member of ethanol and propanol and the silicon-containing alkyl acrylate, so that at least one member of ethanol and propanol is more easily removed.

The drying temperature of the polymer after immersing the polymer in the organic solvent (II) may be a temperature or so at which the organic solvent (II) in which the organic solvent (I) is dissolved is sufficiently removed, and is not particularly limited. It is desired that the drying temperature is a temperature at which the organic solvent (II) is sufficiently removed for a short period of time and is less than deformation temperature of the polymer. For instance, it is usually desired that the drying temperature is 40° to 110° C. or so.

The drying time of the above polymer may be a necessary time or so for sufficiently removing the organic solvent (II), and is not particularly limited, as the drying temperature. It is desired that the drying time is, as usual, 5 to 100 minutes or so.

Also, examples of a drying method of the above polymer are, for instance, an air-drying method, a method by using a drying agent, a heat-drying method, a reduced pressure-drying method and the like.

Next, the polymer which is, as occasion demands, dried is hydrated, so that the ocular lens of the present invention and the contact lens of the present invention can be produced.

When the polymer is hydrated, even if the organic solvent (II) which maybe contains the non-reacted polymerizable components and the organic solvent (I) slightly remains in the polymer, the organic solvent (II) immediately and easily elutes into water because the organic solvent (II) is water-soluble. Accordingly, the ocular lens (contact lens) never occurs cloud in white owing to the organic solvent (II), safety of the lens is never lowered, and producing time is shortened.

A method for hydrating the polymer is not particularly limited, and for instance, a method comprising immersing the polymer in water such as distilled water, isotonic sodium chloride solution or an aqueous solution of which osmotic pressure and pH are suitably adjusted, and the like can be employed.

Moreover, during the above hydration of the polymer, there is a fear that water is saturated with the organic solvent (II) which has eluted into water, so that the amount of eluting organic solvent (II) from the polymer reduces as time goes on. Accordingly, in order to disperse eluting components in water and accelerate elution of the organic solvent (IT) and the like into water, it is desired that the polymer is hydrated by introducing air into water in which the polymer is immersed.

A method for introducing air into water is not particularly limited, and there can be employed, for instance, a method comprising introducing the prescribed gas into water, vaporizing at least one part of the organic solvent (II) and the like in water with generated bubbles, capturing vaporized organic solvent (II) and the like with the bubbles and taking out captured organic solvent (II) and the like when the bubbles rise to the surface and are released out of water; and the like.

Moreover, examples of the gas which is introduced into water are, for instance, oxygen gas, nitrogen gas, air, water vapor and the like.

Furthermore, in the present invention, in order to completely remove a fear that the non-reacted monomer, the organic solvent (I) and the organic solvent (II) remain in the polymer, to make sure, it is desired that the polymer is heated at the same time as the hydration of the polymer or after the hydration of the polymer.

A method for heating the polymer at the same time as the hydration of the polymer or after the hydration of the polymer is not particularly limited, and a method comprising boiling by electrical heating, bath-solution heating or gas heating, and the like can be employed.

When the polymer is heated at the same time as the hydration of the polymer or after the hydration of the polymer, the heating temperature of the polymer is not particularly limited. It is desired that the heating temperature is a temperature at which remaining components are surely removed for a short period of time and is less than deformation temperature of the polymer. For instance, it is usually desired that the heating temperature is 35° to 100° C. or so.

The heating time of the above polymer may be a necessary time or so for surely removing the residual components, and is not particularly limited, as the heating temperature. It is desired that the heating time is, as usual, 10 to 120 minutes or so.

As mentioned above, the desired ocular lens (contact lens) of the present invention can be produced, and in the present invention, as occasion demands, mechanical processes such as cutting process and polishing process may be carried out. Moreover, it is usually desired that the polymer which is not hydrated yet is mechanically processed.

In accordance with the process of the present invention, phase separation and cloud in white never occur during the polymerization reaction, and there can be extremely easily produced an ocular lens such as a contact lens or an intraocular lens, which is, in particular, remarkably excellent in transparency, has flexibility, is excellent in wettability, and furthermore has high safety. Also, by suitably adjusting the kinds and amount of the polymerizable components, an ocular lens such as a contact lens, which is also excellent in oxygen permeability and stain resistance can be easily produced.

Next, the present invention is more specifically explained by means of the following Examples, and it is to be understood that the present invention is not limited to the Examples.

EXAMPLES 1 to 13

After an ocular lens component composed of a mixture of a polymerizable component and a polymerization initiator which were shown in Table 1 was mixed with an organic solvent (I) shown in Table 2 in the proportion shown in Table 2, the obtained mixture was injected into a mold having the shape of a contact lens (made of polypropylene, corresponding to a contact lens having a diameter of 13.8 mm and a thickness of 0.1 mm).

Then, the mold was transferred into a constant temperature bath and the thermal polymerization was carried out at 35° C. for 70 hours and at 50° C. for 67 hours. After that, the mold was transferred into a vacuum drier and the content in the mold was dried at 50° C. for 24 hours under the reduced pressure, and furthermore, the mold was transferred into a circulating drier and the thermal polymerization was carried out at 50° C. for 8 hours. Furthermore, the temperature of the content in the mold was raised to 120° C. at a rate of 10° C. /2 hours, the thermal polymerization was carried out at 120° C. for 1 hour and the content in the mold was gradually cooled to room temperature to give a polymer having the shape of a contact lens.

The obtained polymer was taken off from the mold and dried, and after the polymer was immersed in 100 ml of an aqueous organic solvent (II) shown in Table 2 for 60 minutes, the polymer was dried at 110° C. for 60 minutes in the circulating drier.

Then, the dried polymer was immersed in isotonic sodium chloride solution and hydrated by the absorption of water to give a contact lens.

Transparency of the obtained contact lens was examined in accordance with the following method. The results are shown in Table 2.

[Transparency]

The appearance of the contact lens was observed with naked eyes and evaluated on the basis of the following criteria for evaluation. (Criteria for evaluation)

A: There is no cloud at all, transparency is extremely excellent and it is suitable for a contact lens.

B: There is slight cloud, however, it has sufficient transparency as a contact lens.

C: There is cloud in white and transparency is poor, accordingly, it is difficult to use as a contact lens.

D: There is sure cloud in white and transparency is extremely poor, accordingly, it is impossible to use as a contact lens.

EXAMPLES 14 to 22

After an ocular lens component composed of a mixture of a polymerizable component and a polymerization initiator which were shown in Table 1 was mixed with an organic solvent (I) shown in Table 2 in the proportion shown in Table 2, the obtained mixture was injected into the same mold as used in Examples 1 to 13.

Then, the mold was transferred into the constant temperature bath and the photo polymerization was carried out at 35° C. by irradiating a light having a wavelength of 360 nm to the content in the mold for 30 minutes using a mercury lamp to give a polymer having the shape of a contact lens.

The obtained polymer was taken off from the mold and dried, and after the polymer was immersed in 100 ml of an aqueous organic solvent (II) shown in Table 2 for 60 minutes, the polymer was dried at 110° C. for 60 minutes in the same manner as in Example 1.

Then, the dried polymer was hydrated in the same manner as in Example 1 to give a contact lens.

Transparency of the obtained contact lens was examined in the same manner as in Example 1. The results are shown in Table 2.

Moreover, in Examples 16 and 17, other desired plates were produced in addition to the contact lenses. Water content, swelling coefficient with oleic acid and oxygen permeability were examined in accordance with the following methods, respectively.

As a result, with respect to the plate produced in Example 16, water content was 14% by weight, swelling coefficient with oleic acid was 111% and oxygen permeability was $96\times10^{-11}$ ($cm^2$/sec). (ml $O_2$/(ml×mmHg)). With respect to the plate produced in Example 17, water content was 19% by weight, swelling coefficient with oleic acid was 107% and oxygen permeability was $136\times10^{-11}$ ($cm^2$/sec) (ml $O_2$/(ml×mmHg)).

[Water content]

Water content (% by weight) at 25° C. of the plate having a thickness of about 4 mm and a diameter of 14 mm was calculated on the basis of the following equation.

$$\text{Water content (\% by weight)}=\{(W-W_o)/W\}\times100$$

wherein W is a weight (g) of the contact lens in the equilibrated and hydrated state after the hydration of the polymer, and $W_o$ is a weight (g) of the contact lens in the dried state by drying in a drier after the hydration of the polymer.

[Swelling coefficient with oleic acid]

After the diameter (D (mm)) of the hydrated plate having a thickness of 0.2 mm was measured at 35° C., the plate was immersed in oleic acid which was one member of lacrimal fluid components. At the time when the plate reached to the equilibrated and swelled state, the diameter ($D_o$ (mm)) of the plate in oleic acid was measured, and then, swelling coefficient with oleic acid (%) which was an index of lipid-stain resistance was calculated on the basis of the following equation.

$$\text{Swelling coefficient with oleic acid (\%)}=\{(D_o-D)/D\}\times100$$

[Oxygen permeability]

Using a Seikaken-type film oxygen-gas permeator made by RIKASEIKI KOGYO CO., LTD., oxygen permeability of the plate having a thickness of about 0.4 mm and a diameter of 14 mm was measured in isotonic sodium chloride solution at 35° C.

EXAMPLES 23 to 25

After an ocular lens component composed of a mixture of a polymerizable component and a polymerization initiator which were shown in Table 1 was mixed with an organic solvent (I) shown in Table 2 in the proportion shown in Table 2, the obtained mixture was injected into the same mold as used in Examples 1 to 13.

Then, a polymer having the shape of a contact lens was produced in the same manner as in Example 1, and the polymer was taken off from the mold and dried, and then, the polymer was immersed in 100 ml of an aqueous organic solvent (II) shown in Table 2 for 60 minutes.

After that, the polymer was taken off from the organic solvent (II) and the polymer was directly hydrated in the same manner as in Example 1 to give a contact lens.

Transparency of the obtained contact lens was examined in the same manner as in Example 1. The results are shown in Table 2.

EXAMPLE 26

In Example 22, a contact lens was produced in the same manner as in Example 22 except that a three neck round bottom flask which was equipped with a separating funnel, a thermometer and a T-tube and furhter, connected to a condenser was charged with the polymer and 100 ml of distilled water, and the polymer was hydrated by a method comprising blowing air into distilled water with heating in water bath at 93° C. for 30 minutes at a flow rate of 100 ml/minute so as to form bubbles having a diameter of 0.5 to 1 mm and introducing air into distilled water with dropping distilled water into the flask so as to maintain the amount of distilled water in a nearly constant state. Moreover, the gas was exhausted through the T-tube of the flask.

Transparency of the obtained contact lens was examined in the same manner as in Example 1. As a result, the evaluation was "A".

Comparative Examples 1 to 4

In Example 1, a contact lens was produced in the same manner as in Example 1 except that the organic solvent (I) was not used, that the kinds of an ocular lens component were changed to those shown in Table 3 and that the polymer obtained by the thermal polymerization was directly hydrated.

Transparency of the obtained contact lens was examined in the same manner as in Example 1. The results are shown in Table 3.

Comparative Examples 5 to 6

In Example 14, a contact lens was produced in the same manner as in Example 14 except that the organic solvent (I) was not used, that the kinds of an ocular lens component were changed to those shown in Table 3 and that the polymer obtained by the photo polymerization was directly hydrated.

Transparency of the obtained contact lens was examined in the same manner as in Example 1. The results are shown in Table 3.

Comparative Example 7

In Example 1, a contact lens was produced in the same manner as in Example 1 except that the kinds of an ocular lens component and an organic solvent (I), and the proportion of the ocular lens component to the organic solvent (I) were changed to those shown in Table 3, and that the polymer obtained by the thermal polymerization was directly hydrated.

Transparency of the obtained contact lens was examined in the same manner as in Example 1. The result is shown in Table 3.

Comparative Example 8

In Example 14, a contact lens was produced in the same manner as in Example 14 except that the kinds of an ocular lens component and an organic solvent (I), and the proportion of the ocular lens component to the organic solvent (I) were changed to those shown in Table 3, and that the polymer obtained by the photo polymerization was directly hydrated.

Transparency of the obtained contact lens was examined in the same manner as in Example 1. The result is shown in Table 3.

Comparative Example 9

In Example 1, a contact lens was produced in the same manner as in Example 1 except that the kinds of an ocular lens component and an organic solvent (I), and the proportion of the ocular lens component to the organic solvent (I) were changed to those shown in Table 3, and that the polymer obtained by the thermal polymerization was dried at 110° C. for 60 minutes without immersing in the aqueous organic solvent (II) and then, the polymer was hydrated.

Transparency of the obtained contact lens was examined in the same manner as in Example 1. The result is shown in Table 3.

Comparative Examples 10 to 13

In Example 14, a contact lens was produced in the same manner as in Example 14 except that the kinds of an ocular lens component and an organic solvent (I), and the proportion of the ocular lens component to the organic solvent (I) were changed to those shown in Table 3, and that the polymer obtained by the photo polymerization was dried at 110° C. for 60 minutes without immersing in the aqueous organic solvent (II) and then, the polymer was hydrated.

Transparency of the obtained contact lens was examined in the same manner as in Example 1. The results are shown in Table 3.

Moreover, in Examples 22 and 26 and Comparative Example 13, the proportion of monomers which were remaining in the obtained contact lens to the lens (coefficient of residual monomer) was examined in accordance with the following method.

As a result, coefficient of residual monomer of both contact lenses obtained in Examples 22 and 26 was at most 0.01% by weight, and coefficient of residual monomer of the contact lens obtained in Comparative Example 13 was 10.7% by weight.

[Coefficient of residual monomer]

After about 1 g of the contact lens was immersed in 100 ml of acetone for 72 hours, the contact lens was taken off and residual monomers of the contact lens, which eluted into acetone were collected by removing acetone. The weight of the collected residual monomers was measured and coefficient of residual monomer (% by weight) of the contact lens was calculated on the basis of the following equation.

$$\text{Coefficient of residual monomer (\% by weight)}=\{T/T_o\}\times 100$$

wherein T is a weight (g) of the residual monomers, and $T_o$ is a weight of the contact lens.

Moreover, each code listed on Table 1 shows the following compound.

SK5001: Tris(trimethylsiloxy)silylpropyl methacrylate

SK5100: Trimethylsilylstyrene

SK5012: Tris(trimethylsiloxy)silylstyrene

SK5021: Tris(trimethylsiloxy)silylpropyl acrylate

SK6006: Macromonomer represented by the formula:

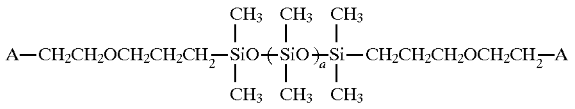

wherein A is a group represented by the formula:

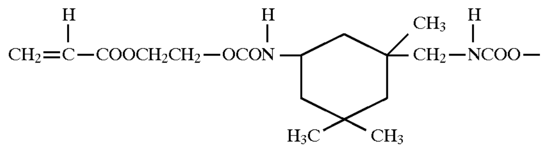

and a is an integer of 20 to 50)

3FEMA: 2,2,2-Trifluoroethyl methacrylate

6FPMA: 2,2,2,2',2',2'-Hexafluoroisopropyl methacrylate

3FEA: 2,2,2-Trifluoroethyl acrylate

6FPA: 2,2,2,2',2',2'-Hexafluoroisopropyl acrylate

2HEMA: 2-Hydroxyethyl methacrylate

2HEA: 2-Hydroxyethyl acrylate

2HPA: 2-Hydroxypropyl acrylate

MEGMA: 2,3-Dihydroxy-2-methylpropyl methacrylate

EDMA: ethylene glycol dimethacrylate

DMAA: N,N-Dimethylacrylamide

V-65: 2,2'-Azobis(2,4-dimethylvaleronitrile)

Darocur: 2-Hydroxy-2-methyl-1-phenyl-propane-1-one

Also, the amount of the polymerization initiator shown in Table 1 is an amount (part) based on 100 parts of the total amount of the polymerizable component.

Furthermore, in Table 2 and Table 3, existence of the drying step for the polymer, which was employed in order to more sufficiently remove the organic solvent (II), was also described.

TABLE 1

| Composition of ocular lens component Polymerizable component (% by weight) | | | | | | | | | | | | |
|---|---|---|---|---|---|---|---|---|---|---|---|---|
| (A-1) | | | | | (A-2) | | | | (B) | | | |
| SK5001 | SK5100 | SK5012 | SK5021 | SK6006 | 3FEMA | 6FPMA | 3FEA | 6FPA | 2HEMA | 2HEA | 2HPA | MEGMA |
| 56 | — | — | — | — | — | — | — | — | 43.5 | — | — | — |
| 40 | — | — | — | — | — | — | — | — | 30 | — | — | — |
| 36 | — | — | — | — | — | — | — | — | — | — | — | 37 |
| — | 30 | — | — | — | — | — | — | — | 40 | — | — | — |
| — | — | 30 | — | — | — | — | — | — | 40 | — | — | — |
| — | — | — | — | — | 49.5 | — | — | — | 50 | — | — | — |
| — | — | — | — | — | — | 49.5 | — | — | 50 | — | — | — |
| — | — | — | 10 | — | — | — | — | — | 89 | — | — | — |
| — | — | — | 50 | — | — | — | — | — | — | 48 | — | — |
| — | — | — | 70 | — | — | — | — | — | 19.5 | 10 | — | — |
| — | — | — | 30 | 30 | — | — | — | — | 19 | 20 | — | — |
| — | — | — | 50 | — | — | — | — | — | — | — | 48 | — |
| 20 | — | — | 50 | — | — | — | — | — | 19.5 | 10 | — | — |
| — | — | — | — | — | — | — | 49.5 | — | 50 | — | — | — |
| — | — | — | — | — | — | — | — | 49.5 | 50 | — | — | — |
| — | — | — | 29.7 | 39.7 | — | — | — | — | 29.7 | — | — | — |

TABLE 1-continued

| Composition of ocular lens component: Polymerizable component (% by weight) (C) EDMA | (D) DMAA | Polymerization initiator (part) V-65 | Darocur | Code of ocular lens composition |
|---|---|---|---|---|
| 0.5 | — | 0.2 | — | a |
| 0.5 | 29.5 | 0.2 | — | b |
| 0.5 | 29.5 | 0.2 | — | c |
| 0.5 | 29.5 | 0.2 | — | d |
| 0.5 | 29.5 | 0.2 | — | e |
| 0.5 | — | 0.2 | — | f |
| 0.5 | — | 0.2 | — | g |
| 1 | — | — | 0.5 | h |
| 2 | — | — | 0.5 | i |
| 0.5 | — | — | 0.5 | j |
| 1 | — | — | 0.5 | k |
| 2 | — | — | 0.5 | l |
| 0.5 | — | — | 1 | m |
| 0.5 | — | — | 1 | n |
| 0.5 | — | — | 1 | o |
| 0.9 | — | — | 1 | p |

TABLE 2

| Ex. No. | Kinds of ocular lens component and amount thereof (% by weight) | Organic solvent: Kinds of (I) and amount thereof (% by weight) | Kinds of (II) | Existence of drying step | Transparency of contact lens |
|---|---|---|---|---|---|
| 1 | a (50) | Acetonitrile | (50) Acetone | Existence | A |
| 2 | a (50) | Acetone | (50) Acetone | Existence | A |
| 3 | a (47) | Ethanol | (53) Acetone | Existence | A |
| 4 | a (45) | 1-Propanol | (45) Acetone | Existence | A |
| 5 | a (46) | 1-Kexanol | (54) Acetone | Existence | A |
| 6 | a (44) | Chloroform | (56) Acetone | Existence | A |
| 7 | b (66) | Methyl ethyl ketone | (34) Acetone | Existence | A |
| 8 | b (16) | Acetone | (84) Acetone | Existence | A |
| 9 | c (66) | Acetone | (34) Acetone | Existence | A |
| 10 | d (73) | Acetone | (23) Ethanol | Existence | A |
| 11 | e (73) | Acetone | (23) Ethanol | Existence | A |
| 12 | f (80) | Acetone | (20) Ethanol | Existence | A |
| 13 | g (80) | Acetone | (2O) Ethanol | Existence | A |
| 14 | h (50) | 1-Butanol | (50) Ethanol | Existence | A |
| 15 | i (75) | 1-Butanol | (25) Ethanol | Existence | A |
| 16 | j (66) | 1-Propanol | (34) Ethanol | Existence | A |
| 17 | k (66) | 1-Butanol | (34) Ethanol | Existence | A |
| 18 | l (70) | 1-Butanol | (30) Acetone | Existence | A |
| 19 | m (50) | 1-Butanol | (50) Ethanol | Existence | A |
| 20 | n (75) | 1-Butanol | (25) Ethanol | Existence | A |
| 21 | o (75) | 1-Butanol | (25) Ethanol | Existence | A |
| 22 | p (62) | 1-Butanol | (38) 2-Propanol | Existence | A |
| 23 | b (50) | Acetone | (50) Acetone | None | A |
| 24 | o (75) | 1-Butanol | (25) 2-Propanol | None | A |
| 25 | p (50) | 1-Butanol | (50) 2-Propanol | None | A |

TABLE 3

| Com. Ex. No. | Kinds of ocular lens component and amount thereof (% by weight) | Organic solvent: Kinds of (I) and amount thereof (% by weight) | Kinds of (II) | Existence of drying step | Transparency of contact lens |
|---|---|---|---|---|---|
| 1 | a (100) | — | — | None | C |
| 2 | b (100) | — | — | None | C |
| 3 | c (100) | — | — | None | D |
| 4 | g (100) | — | — | None | D |
| 5 | j (100) | — | — | None | D |

TABLE 3-continued

| Com. Ex. No. | Kinds of ocular lens component and amount thereof (% by weight) | Organic solvent Kinds of (I) and amount thereof (% by weight) | Kinds of (II) | Existence of drying step | Transparency of contact lens |
|---|---|---|---|---|---|
| 6 | n (100) | — | — | None | D |
| 7 | a (47) | Ethanol (53) | — | None | C |
| 8 | j (66) | 1-Propanol (34) | — | None | D |
| 9 | a (56) | Chloroform (44) | — | Existence | C |
| 10 | i (75) | 1-Butanol (25) | — | Existence | D |
| 11 | j (66) | 1-Propanol (34) | — | Existence | D |
| 12 | n (75) | 1-Propanol (25) | — | Existence | D |
| 13 | p (62) | 1-Butanol (38) | — | Existence | D |

From the results shown in Table 2 and the result in Example 26, it can be understood that all contact lenses produced by the process of the present invention using, in particular, at least one member of the polymerizable silicon-containing compound (A-1) and the polymerizable fluorine-containing compound (A-2), the hydroxyalkyl (meth) acrylate (B) and the crosslinkable compound (C) in Examples 1 to 16, 18 to 21, 23 to 24 and 26, and all contact lenses produced by the process of the present invention using the polymerizable component (α) as the polymerizable component in Examples 17, 22 and 25 are excellent in transparency.

On the contrary, from the results shown in Table 3, it can be understood that when the organic solvent (I) is not used and the polymer is not immersed in the organic solvent (II) (Comparative Examples 1 to 6), and when the polymer is not immersed in the aqueous organic solvent (II) (Comparative Examples 7 to 13), all the obtained contact lenses are poor in transparency and accordingly, the lenses cannot be used as contact lenses.

Also, as mentioned above, it can be understood that the plates produced in the same manner as the contact lenses in Examples 16 and 17 have a swelling coefficient with oleic acid of about 110%, much lower than 150%, and are excellent in, particularly, lipid-stain resistance, and that the plates have a high oxygen permeability and are also excellent in oxygen permeability.

Therefore, it can be understood that in accordance with the process for producing an ocular lens of the present invention comprising using, in particular, the polymerizable silicon-containing compound (A-1), the hydroxyalkyl (meth)acrylate (B) and the crosslinkable compound (C), and in accordance with the process for producing a contact lens of the present invention comprising using the polymerizable component (α) as the polymerizable component, contact lenses which are also excellent in stain resistance and oxygen permeability can be produced.

Furthermore, as mentioned above, it can be understood that the contact lenses obtained in Examples 22 and 26 have an extremely low coefficient of residual monomer of at most 0.01% by weight and have remarkably high safety.

Therefore, it can be understood that in accordance with, in particular, the process for producing a contact lens of the present invention comprising using the polymerizable component (α) as the polymerizable component, contact lenses which have high safety can be produced.

INDUSTRIAL APPLICABILITY

In accordance with the process of the present invention, phase separation and cloud in white never occur during the polymerization reaction, and there can be extremely easily produced an ocular lens such as a contact lens or an intraocular lens, which is, in particular, remarkably excellent in transparency and has flexibility, excellent wettability and further, high safety.

Also, by suitably adjusting the kinds and amount of the polymerizable component, there can be easily produced an ocular lens such as a contact lens, which is also excellent in oxygen permeability and stain resistance.

Furthermore, in accordance with the process of the present invention, organic solvents never remain in the obtained ocular lens such as contact lens in spite of the use of the organic solvents and furthermore, non-reacted polymerizable components never remain in the ocular lens. Accordingly, effect such that safety of the obtained ocular lens such as contact lens becomes high can be exhibited.

I claim:

1. A process for producing a contact lens comprising:

mixing a polymerizable component for an ocular lens containing 3 to 85% by weight of a silicon-containing alkyl acrylate, and a polysiloxane. macromonomer in which a polymerizable group bonds to a siloxane main chain through one or two urethane bonds, and which is represented by the formula (X):

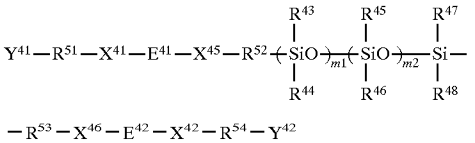

(X)

wherein each of $Y^{41}$ and $Y^{42}$ is independently acryloyl group, methacryloyl group, vinyl group or allyl group, each of $R^{51}$ and $R^{54}$ is independently a linear or branched alkylene group having 2 to 6 carbon atoms, each of $X^{41}$ and $X^{42}$ is independently a covalent bond, oxygen atom or an alkylene glycol, each of $R^{52}$ and $R^{53}$ is independently a linear or branched alkylene group having 1 to 6 carbon atoms, each of $R^{43}$, $R^{44}$, $R^{45}$, $R^{46}$, $R^{47}$ and $R^{41}$ is independently an alkyl group having 1 to 3 carbon atoms or phenyl group, each of $E^{41}$ and $E^{42}$ is independently —NHCO— (in this case, $X^{41}$ and $X^{42}$ are covalent bonds, an urethane bond is formed between $E^{41}$ and $X^{45}$, and an urethane bond is formed between $E^{42}$ and $X^{46}$) or a divalent group derived from a diisocyanate selected from a saturated aliphatic diisocyanate, an alicyclic diisocyanate and an aromatic diisocyanate (in this case, each of $X^{41}$ and $X^{42}$ is independently oxygen atom or an alkylene glycol group, $E^{41}$ forms an urethane bond between $X^{41}$ and $X^{45}$, and $E^{42}$ forms an urethane bond between $X^{42}$ and $X^{46}$), each of $X^{45}$ and $X^{46}$ is independently oxygen atom, an alkylene glycol group or a group represented by the formula (XI):

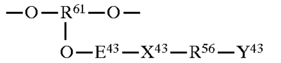

(XI)

in which $R^{61}$ is a trivalent hydrocarbon group having 1 to 6 carbon atoms, $Y^{41}$is acryloyloxy group, methacryloyloxy group, vinyl group or allyl group, $R^{56}$ is a linear or branched alkylene group having 2 to 6 carbon atoms, $X^{43}$ is a covalent bond, oxygen atom or an alkylene glycol group, $E^{43}$ is —NHCO— (in this case, $X^{43}$ is a covalent bond) or a divalent group derived from a diisocyanate selected from a saturated aliphatic diisocyanate, an alicyclic diisocyanate and an aromatic diisocyanate (in this case, $X^{43}$ is oxygen atom or an alkylene glycol group) and in which each of $X^{45}$ and $X^{46}$ forms an urethane bond between neighboring oxygen atom bonding to $R^{61}$ and $X^{43}$, m1 is an integer of 1 to 1500, and m2 is an integer of 0 to 1499 (also, (m1+m2) ≦1500), 10 to 95% by weight of a hydroxyalkyl (meth)acrylate (B), and 0.01 to 10% by weight of a crosslinkable compound (C) having at least two polymerizable groups;

with at least one member of butanol and pentanol which can dissolve the polymerizable component, injecting the obtained mixture into a mold having the desired shape for a contact lens and then, preparing a polymer by the polymerization reaction, immersing the polymer taken off from said mold in at least one member of ethanol and propanol which have compatibility with at least one member of butanol and pentanol, and then, hydrating said polymer; and wherein the weight ratio of the polymerizable component for an ocular lens to at least one member of butanol and pentanol (polymerizable component/at least one member of butanol and pentanol) is 50/50 to 66/34.

2. The process of claim 1, wherein said silicon-containing alkyl acrylate is tris(trimethylsiloxy)silylpropyl acrylate.

3. The process of claim 1, wherein said hydroxyalkyl (meth)acrylate (B) is hydroxyethyl (meth)acrylate.

4. The process of claim 1, wherein after said polymer is immersed in at least one member of ethanol and propanol, the polymer is dried before hydrating the polymer.

5. The process of claim 1, wherein said polymer is hydrated by introducing air in to water in which the polymer is immersed.

6. The process of claim 1, wherein said polymer is heated at the same time as the hydration of the polymer or after the hydration of the polymer.

7. A contact lens produced by the process of claim 1.

8. The process of claim 1, wherein said polysiloxane, macromonomer represented by the formula (X) is a macromonomer represented by the formula:

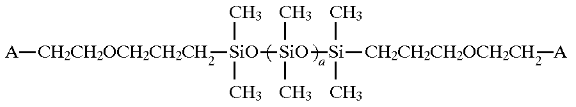

wherein A is a group represented by the formula:

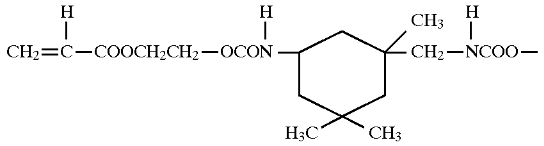

and a is an integer of 20 to 50.

9. The process of claim 1, wherein said polymerizable component contains 29.7 to 30% by weight of the silicon-containing alkyl acrylate, 30 to 39.7% by weight of the polysiloxane macromonomer represented by the formula (X), 29.7 to 39% by weight of the hydroxyalkyl (meth)acrylate (B), and 0.9 to 1% by weight of the crosslinkable compound (C).

10. The process of claim 9, wherein said silicon-containing alkyl acrylate is tris(trimethylsiloxy) silylpropyl acrylate.

11. The process of claim 9, wherein said hydroxyalkyl (meth)acrylate (B) is hydroxyethyl (meth)acrylate.

12. The process of claim 9, wherein said polysiloxane macromonomer represented by the formula (X) is a macromonomer represented by the formula:

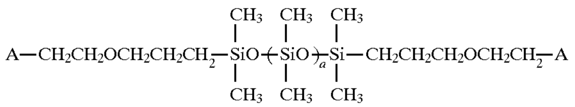

wherein A is a group represented by the formula:

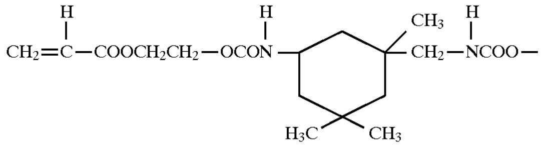

and a is an integer of 20 to 50.

13. An ocular lens material comprising a polymer prepared by polymerizing a polymerizable component for an ocular lens containing 3 to 85% by weight of a silicon-containing alkyl acrylate, and a polysiloxane macromonomer in which a polymerizable group bonds to a siloxane main chain through one or two urethane bonds, and which is represented by the formula (X):

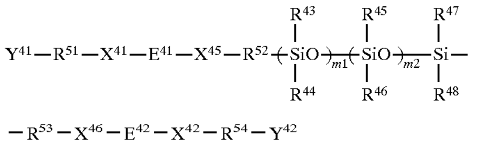

(X)

wherein each of $Y^{41}$ and $Y^{42}$ is independently acryloyl group, methacryloyl group, vinyl group or allyl group, each of $R^{51}$ and $R^{54}$ is independently a linear or branched alkylene group having 2 to 6 carbon atoms, each of $X^{41}$ and $X^{42}$ is independently a covalent bond, oxygen atom or an alkylene glycol, each of $R^{52}$ and $R^{53}$ is independently a linear or branched alkylene group having 1 to 6 carbon atoms, each of $R^{43}$, $R^{44}$, $R^{45}$, $R^{46}$, $R^{47}$ and $R^{48}$ is independently an alkyl group having 1 to 3 carbon atoms or phenyl group, each of $E^{41}$ and $E^{42}$ is independently —NHCO— (in this case, $X^{41}$ and $X^{42}$ are covalent bonds, an urethane bond is formed between $E^{41}$ and $X^{45}$, and an urethane bond is formed between $E^{42}$ and $X^{46}$) or a divalent group derived from a diisocyanate selected from a saturated aliphatic diisocyanate, an alicyclic diisocyanate and an aromatic diisocyanate (in this case, each of $X^{41}$ and $X^{42}$ is independently oxygen atom or an alkylene glycol group, $E^{41}$ forms an urethane bond between $X^{41}$ and $X^{45}$, and $E^{42}$ forms an urethane bond between $X^{42}$ and $X^{46}$), each of $X^{45}$ and $X^{46}$ is independently oxygen atom, an alkylene glycol group or a group represented by the formula (XI):

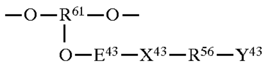

(XI)

in which $R^{61}$ is a trivalent hydrocarbon group having 1 to 6 carbon atoms, $Y^{43}$ is acryloyloxy group, methacryloyloxy group, vinyl group or allyl group, $R^{56}$ is a linear or branched alkylene group having 2 to 6 carbon atoms, $X^{43}$ is a covalent bond, oxygen atom or an alkylene glycol group, $E^{43}$ is —NHCO— (in this case, $X^{43}$ is a covalent bond) or a divalent group derived from a diisocyanate selected from a saturated aliphatic diisocyanate, an alicyclic diisocyanate and an aromatic diisocyanate (in this case, $X^{43}$ is oxygen atom or an alkylene glycol group) and in which each of $X^{45}$ and $X^{46}$ forms an urethane bond between neighboring oxygen atom bonding to $R^{61}$ and $X^{43}$, m1 is an integer of 1 to 1500, and m2 is an integer of 0 to 1499 (also, (m1+m2) $\leqq$1500), 10 to 95% by weight of a hydroxyalkyl (meth)acrylate (B), and 0.01 to 10% by weight of a crosslinkable compound (C) having at least two polymerizable groups.

14. The ocular lens material of claim 13, wherein said silicon-containing alkyl acrylate is tris(trimethylsiloxy) silylpropyl acrylate.

15. The ocular lens material of claim 13, wherein said hydroxyalkyl (meth)acrylate (B) is hydroxyethyl (meth) acrylate.

16. The ocular lens material of claim 13, wherein said polysiloxane macromonomer represented by the formula (X) is macromonomer represented by the formula:

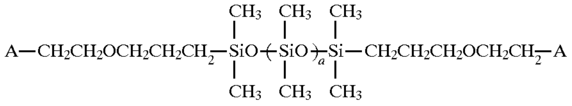

wherein A is a group represented by the formula:

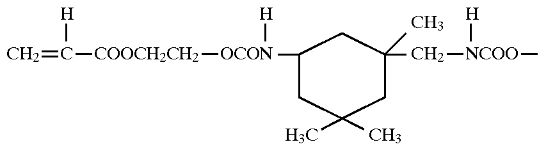

and a is an integer of 20 to 50.

17. The ocular lens material of claim 13, wherein said polymerizable component contains 29.7 to 30% by weight of the silicon-containing alkyl acrylate, 30 to 39.7% by weight of the polysiloxane macromonomer represented by the formula (X), 29.7 to 39% by weight of the hydroxyalkyl (meth)acrylate (B), and

0.9to 1% by weight of the crosslinkable compound (C).

18. The ocular lens material of claim 17, wherein said silicon-containing alkyl acrylate is tris(trimethylsiloxy) silylpropyl acrylate.

19. The ocular lens material of claim 17, wherein said hydroxyalkyl (meth)acrylate (B) is hydroxyethyl (meth) acrylate.

20. The ocular lens material of claim 17, wherein said polysiloxane macromonomer represented by the formula (X) is macromonomer represented by the formula:

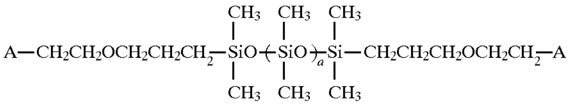

wherein A is a group represented by the formula:

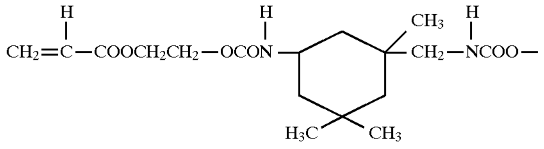

and a is an integer of 20 to 50.

* * * * *